Dec. 21, 1948.    W. L. CARLSON    2,456,915
ANGLE MODULATED WAVE DETECTOR
Filed May 22, 1945    2 Sheets-Sheet 1
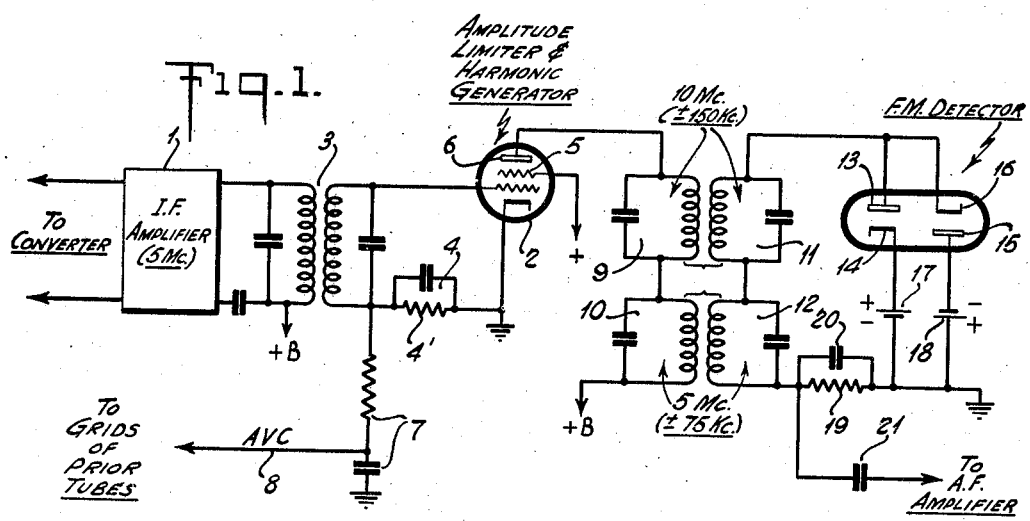
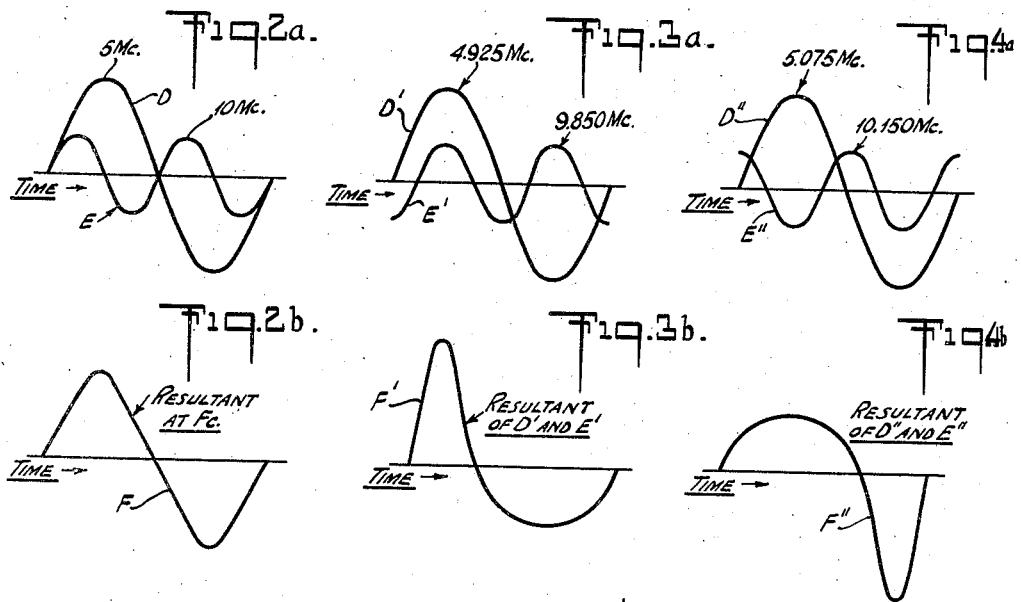
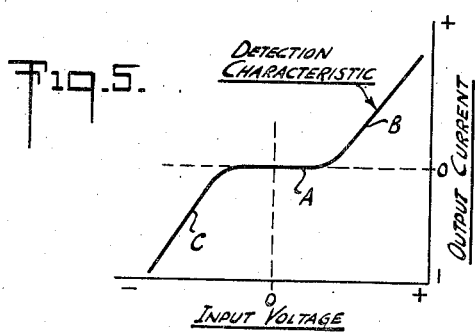
INVENTOR
WENDELL L. CARLSON.
BY
ATTORNEY Dec. 21, 1948.  W. L. CARLSON  2,456,915
ANGLE MODULATED WAVE DETECTOR
Filed May 22, 1945  2 Sheets-Sheet 2
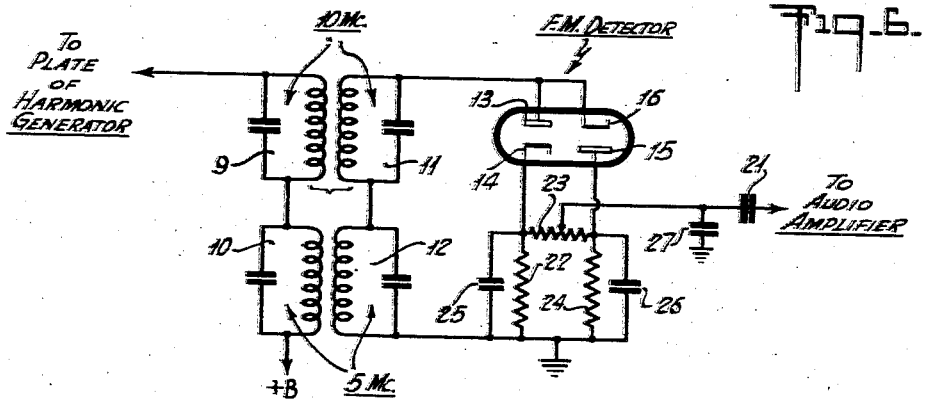
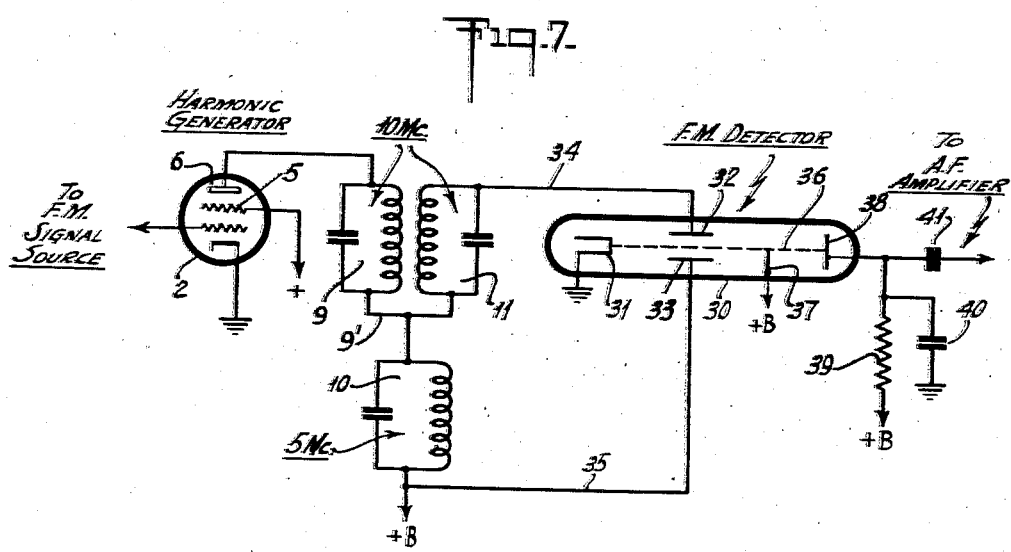
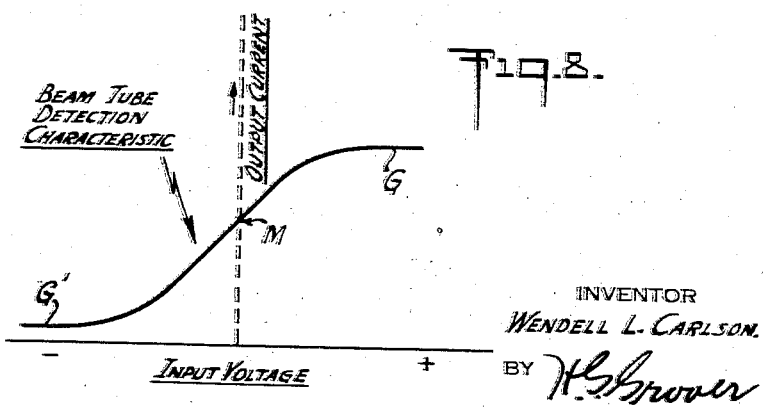
INVENTOR
WENDELL L. CARLSON.
BY
ATTORNEY Patented Dec. 21, 1948

2,456,915

UNITED STATES PATENT OFFICE 2,456,915

ANGLE MODULATED WAVE DETECTOR

Wendell L. Carlson, Princeton, N. J., assignor to Radio Corporation of America, a corporation of Delaware Application May 22, 1945, Serial No. 595,209

14 Claims. (Cl. 250—27)

1

My present invention relates to novel detectors for angle modulated high frequency waves, and more particularly to a novel method of, and means for, demodulating frequency modulated (FM) carrier waves.

In the prior methods of demodulating FM carrier waves, or more generally angle modulated waves, there has usually been employed opposed rectifiers having applied thereto signal voltages of a common instantaneous frequency but of differing magnitude and polarity. The generic term "angle modulated" comprehends frequency modulation, phase modulation or hybrid modulation possessing characteristics common to both of these. Where a simple rectifier has been employed to detect FM waves, the rectifier has been provided with a sloping filter network so that the symmetrical FM wave could be detected along the most linear portion of the filter slope.

It is an important object of my present invention to provide an improved method of and apparatus for detecting angle modulated waves, wherein there is derived from the latter a wave whose form or shape has a variable degree of asymmetry dependent on the angle modulation, the derived wave being rectified by a symmetrical, non-linear detector to provide a voltage representative of the aforesaid variable asymmetry.

In carrying out my invention, I employ an FM detector system which is characterized by the inclusion of an harmonic generator to produce an harmonic of the signal wave, a phase shifter network for providing phase shifts between the fundamental and harmonic waves, and a symmetrical, non-linear detector which rectifies the resultant of the fundamental and harmonic waves.

A further object of my invention is to provide an FM detector which is unresponsive to voltages of less than a threshold value but for larger voltages responds in either one of two opposite polarities dependent on the sense of variation of the received frequency from the mean frequency. To this end, I further employ oppositely connected rectifiers, biased substantially equally against operation by voltages less than the threshold value.

Another object of my invention is to provide a high frequency signal detector which is characterized by its "input voltage vs. output current" characteristic being symmetrical and having substantial saturation sections at the opposite ends thereof.

Still other features will best be understood by reference to the following description, taken in connection with the drawing, in which I have

2 indicated diagrammatically several circuit organizations whereby my invention may be carried into effect.

In the drawings:

Fig. 1 is a circuit diagram of an FM detector embodying one form of the invention;

Figs. 2a, 3a and 4a respectively show phase relations between fundamental and second harmonic wave forms for different frequency deviations of the signal;

Figs. 2b, 3b and 4b show the respective resultant wave forms derived from Figs. 2a, 3a and 4a;

Fig. 5 shows an "input voltage vs. output current" characteristic for the detector of Fig. 1;

Fig. 6 shows a modification of the detector circuit of Fig. 1;

Fig. 7 shows a further modification of the invention; and

Fig. 8 depicts the detection characteristic for the circuit of Fig. 7.

Referring now to Fig. 1, there is shown the circuit connections of only so much of an FM receiver as is necessary to a proper understanding of the present invention. It is assumed that the receiver is of the superheterodyne type. Those skilled in the art of radio communication are fully aware of the various networks required prior to the intermediate frequency (I. F.) amplifier 1. In the present FM broadcast band of 42 to 50 megacycles (mc.) the channel width assigned to each FM station is 200 kilocycles (kc.) and the permissible frequency deviation of the transmitted wave is 75 kc. My present invention may be employed for reception of such a transmitted wave, but it is to be understood that the invention is in no way restricted to the present FM broadcast band, nor to such particular channel width. Assuming for the purpose of specific illustration, that the receiving system shown in Fig. 1 is adjusted to receive a station in the broadcast band of 42–50 mc., the collected FM signal wave may first be selectively amplified at carrier frequency and then converted to intermediate frequency. The mean intermediate frequency may be, for example, 5 mc. It will be understood that the input terminals of the I. F. amplifier 1 are connected either directly or through preceding I. F. amplifiers, to the output terminals of a suitable prior converter network.

The amplified I. F. energy is applied to the input electrodes of the tube 2 through a tuned I. F. transformer 3. It will be understood that the primary and secondary resonant circuits of transformer 3 are each tuned to the operating I. F., and that the pass band width of transformer 3 is sufficient to pass the maximum frequency swing of the signal waves, i. e. 150 kc. The tube 2 is preferably designed to function as a limiter, since if the detector diode circuits are not perfectly balanced (which they probably will not be), some amplitude modulation noise may otherwise be produced. The limiter tube 2 may be of any suitable type, and includes a resistor-condenser network 4 in the low potential side of its input circuit suited to provide grid circuit limiting action. The screen grid and plate 5 and 6 respectively are operated at a relatively low positive voltage, say +75 volts, so as to provide plate circuit limiting. If desired, the grid current flowing through the resistor 4' in the grid circuit of the limiter tube may be employed to provide automatic volume control (AVC) voltage for the signal grids of prior signal amplifier tubes. The filter network 7 is inserted in the AVC line 8 to eliminate all pulsating current components. Those skilled in the art of radio communication are fully aware of the specific control connections between lead 8 and the controlled amplifiers.

The FM detection system of my invention is interposed between the limiter plate circuit and a suitable modulation signal amplifier not shown. It is to be understood that the succeeding modulation signal amplifier may include one or more stages of amplification terminated by a suitable reproducer. Before describing the functioning of the circuit elements in the detection or demodulation system, the specific circuit connections thereof will be described in detail.

While I have referred to the tube 2 as preferably functioning to provide amplitude limiting of the FM signal waves, I also employ such tube as an amplifier and a harmonic generator. The plate circuit of the tube includes a pair of parallel resonant circuits 9 and 10, and these circuits are connected in series relation. Primary circuit 9 is magnetically coupled to a secondary resonant circuit 11, whereas primary resonant circuit 10 is magnetically coupled to the secondary resonant circuit 12. On the assumption that the mean intermediate frequency is 5 mc., each of circuits 9 and 11 is tuned to 10 mc., the second harmonic of the operating I. F. Each of resonant circuits 10 and 12 is tuned to the fundamental frequency, i. e. 5 mc. Also, the coupling between circuits 9 and 11 and the pass band width of such circuits are chosen to pass efficiently a frequency band of ±150 kc., and the magnetic coupling between circuits 10 and 12 is chosen so as to pass efficiently a frequency band of ±75 kc. In other words, the pass band width of network 9, 11 is double that of the network 10, 12. It is known that frequency variations of the second harmonic frequency will be twice those of the fundamental frequency.

The circuits 9, 11 and 10, 12 provide a phase shifting network producing a resultant wave of variable asymmetry. The detector comprises a pair of oppositely poled rectifiers. Anode 13 and cathode 14 provide one diode rectifier, while anode 15 and cathode 16 provide a second diode rectifier. The anode 13 and cathode 16 are connected in common to the upper side of input circuit 11. As shown, respective and preferably equal biasing voltage sources 17 and 18 are connected between each of cathode 14 and anode 15 and ground. Voltage source 17 biases cathode 14 positive, while voltage source 18 biases anode 15 negative. The load resistor 19, bypassed for high frequency currents by condenser 20, is connected between the lower side of circuit 12 and the grounded negative and positive terminals respectively of voltage sources 17 and 18. The voltage sources 17 and 18 may be otherwise arranged so that the anode of each of the diodes 13, 14 and 15, 16 is negatively biased relative to its cathode.

The condenser 21 derives from across load resistor 19 the audio frequency voltage developed thereacross due to rectification of the resultant signal wave. The condenser 21 may feed one or more audio frequency amplifiers followed by a reproducer. In Fig. 5 there is shown an illustrative "input voltage vs. output current" characteristic of the FM detector circuit. It will be noted that there exists a considerable horizontal section A over which zero output current is produced by the detector despite amplitude variations in the voltage impressed on it. Such variations may be negative and positive input voltations corresponding to small variations of the intermediate frequency above and below its mean frequency. This horizontal section A is due to the bias voltage applied to each rectifier. The input voltage exceeding the bias on one rectifier, due to variation of the intermediate frequency in one direction, causes the rise in output current along section B, while the input voltage on the opposite cycle of the variation of the intermediate frequency causes increase in output current along section C when the voltage exceeds the bias on the second rectifier. The detector characteristic is, therefore, symmetrically non-linear.

I do not wish to be restricted to a particular theory of operation of my invention, particularly as to details of such operation. I now believe the following to be a correct explanation of its manner of operation.

In analyzing the action of the phase shifting circuits, reference is first made to Figs. 2a and 2b. The curves D and E represent idealized wave forms of the respective signal voltages across secondary circuits 12 and 11 when the signals applied to the primary circuit 10 are of the frequency to which circuits 10, 12 are tuned, e. g. 5 mc. That is, curve D is the wave form of the 5 mc. fundamental, and curve E is the wave form of the 10 mc. second harmonic. The phase relation takes into account the usual 90° shift in phase between primary and secondary of coupled resonant circuits tuned to the applied frequencies. A 90° shift of phase at the fundamental and at the second harmonic causes a net relative phase shift of 45°. The amplitude of the second harmonic voltage is preferably, and normally will be, less than the amplitude of the voltage of fundamental frequency, as is also indicated in Fig. 2a. The resultant of waves D and E is depicted by curve F in Fig. 2b.

The curve F is symmetrical, and is secured by adding the wave forms D and E in the usual manner. It is evident from Fig. 2a that at the resonant condition (i. e. when the fundamental and second harmonic frequencies are 5 mc. and 10 mc. in the example given) the resultant signal wave applied to the opposed rectifiers 13, 14 and 15, 16 is symmetrical. Since the detection characteristic is symmetrical about the zero input voltage line, the net output across load resistor 19 must be zero. This follows from the fact that on positive cycles of wave F the anode 13 becomes positive when the bias due to voltage source 17 is overcome. Accordingly, current flows through condenser 20 in one direction. On the negative half cycles of wave F the cathode 16 becomes negative until the bias from source 18 is overcome. Hence, current flows through condenser 20 in the opposite direction. The successive half cycles of curve F being equal, the voltages across resistor 19 will be equal in magnitude but opposite in polarity. The alternations represented by curve F are of intermediate frequency and have no audio component. The net result will, then, be zero audio output voltage when the applied FM signal wave is not modulated.

As is well known, change in the received frequency away from the resonant frequency, e. g., 5 mc., will cause the secondary voltage in circuit 12 to depart from the 90°, i. e. quadrature, phase relation to the primary voltage to an extent and in a sense dependent on the degree of frequency change, the Q of the circuits and whether the frequency becomes greater or less than 5 mc. Concurrently, the second harmonic in primary circuit 9 will be correspondingly changed away from the frequency to which circuits 9 and 11 are tuned, with corresponding departure of the secondary voltage in circuit 11 from the quadrature phase relation. Assume, now, that the FM signals at circuit 10 deviate to a frequency of 4.925 mc. Concurrently, the second harmonic at circuit 9 will have a frequency of 9.850 mc. If we assume, further, that such variation of the received frequency causes a lag in secondary voltages of a full 90° from the in-tune relation of Fig. 2a, the fundamental and second harmonic voltage relations will then be as shown in Fig. 3a, in which curve E' (in its relation to curve D') has been advanced 45°, i. e. the second harmonic lag is one half the fundamental lag on the same time scale. The resultant wave form F' is shown in Fig. 3b.

The design of the circuits may be such that a deviation of −75 kc. from the mean frequency will not shift the secondary voltages a full 90°, and a decrease of frequency at a particular time may, of course, be less than 75 kc. In either of such cases, a decrease of frequency will tend toward establishing the voltage relations depicted in curves D' and E', Fig. 3a.

The wave represented by curve F' is of an unsymmetrical shape. This wave, impressed on the rectifiers, will cause unequal currents to flow through condenser 20. This is readily seen by comparing the upper and lower sections of curve F'. More current will flow during the upper half cycle. Such condition will continue to exist so long as, and to the degree that, the received frequency continues to be lower than the mean frequency, thereby reproducing one half of the modulation cycle impressed on the FM wave.

If, now, the FM signals at circuit 10 shift to 5.075 mc., the secondary harmonic will have a frequency of 10.150 mc. and the phases of the secondary voltages will be changed to the relation shown in Fig. 4a in which curve E'' (in its relation to curve D'') is moved 45° to the left from the position shown in Fig. 2a. The resultant wave form is depicted by curve F'' in Fig. 4b. Here, again, the resultant wave is unsymmetrical. The lower peak of curve F'' is dominant. More current will now flow during the lower half cycle, and will continue to do so so long as the received frequency remains above the mean frequency thereby reproducing the other half of the modulation cycle.

The phase relations between the voltages across circuits 12 and 11, then, vary from one limit to another in dependence on the signal frequency deviations at input circuit 3. The phase relations between curves D and E for frequency deviations between zero and the assumed limit of −75 kc. will lie between those shown in Figs. 2a and 3a, and the phase relations between curves D and E for frequency deviations between zero and +75 kc. will lie between those shown in Figs. 2a and 4a, as will be apparent to those skilled in the art. The degree of asymmetry of curve F will in turn depend on the phase relations between curves D and E, and the magnitude and polarity of the voltage across resistor 19 will respectively depend on the extent and sense of asymmetry of successive curves F.

Amplitude changes in the FM signals at transformer 3, such as amplitude modulation of the carrier, will not produce any change in phase relation between curves D and E, since only frequency changes are effective to cause these phase shifts. Hence, the phase shifter is inherently non-responsive to amplitude modulation of the carrier. Accordingly, an harmonic generator finds highly useful application in my invention without regard to whether it also, like tube 2, acts as a limiter.

It may be desired to have the horizontal section A of the detection characteristic (C, A, B in Fig. 5) vary as a function of signal carrier intensity at the input to the opposed diodes. There exists an optimum relation between signal strength and detection characteristic. In Fig. 6 I have shown a modification of the diode circuits to accomplish this action. Three resistors 22, 23 and 24 replace load resistor 19 and bias sources 17 and 18 of Fig. 1. Resistor 22, shunted by high frequency bypass condenser 25, is connected from cathode 14 to ground. Resistor 24, shunted by high frequency bypass condenser 26, is connected from anode 15 to ground. The bias voltages for diodes 13, 14 and 15, 16 are secured from the respective direct current voltages developed across each of resistors 22 and 24. Thus, signals applied to the harmonic generator cause the cathode 14 to assume a positive potential relative to ground, while anode 15 is caused to assume a negative potential relative to ground. Any change in signal intensity causes the bias voltages across resistors 22 and 24 to vary correspondingly thereby varying the length of the flat section A of the detection characteristic. The audio voltage is taken off from resistor 23 connecting the ungrounded ends of resistors 22 and 24. The audio frequency signal output connection 21 is made to the center tap on resistor 23. Condenser 27 bypasses high frequency signal currents to ground. Thus, the audio voltages across each of resistors 22 and 24 are combined in polarity opposition. The net output voltage is representative of the audio signals. Except as hereinabove described, the arrangement and manner of operation of Fig. 6 is the same as that of Fig. 1.

In Fig. 7 I have modified two features of the system of Fig. 1. The phase shifting network is simplified by omission of resonant circuit 12. Further, the opposed diodes are replaced by an electron beam tube. The lower sides of resonant circuits 9 and 11 are directly connected together by lead 9', and the lead is connected to the upper side of resonant circuit 10. Circuits 9 and 11 are coupled, and each is tuned to 10 mc. Circuit 10 is tuned to 5 mc. The phase shift action occurs as depicted in Figs. 2a, 3a and 4a. The electron beam tube 30 functions as the detection device, and is of the electrostatic deflection type. The tube 30 is provided with an emitter, or electron gun structure, 31 of suitable design. The emitter 31 is grounded, while the pair of spaced electron deflection electrodes 32 and 33 are connected to opposite sides of resonant circuits 10 and 11. Lead 34 connects electrode 32 to the high potential side of circuit 11, while lead 35 connects electrode 33 to the lower end of tuned circuit 10. Electrodes 32 and 33 are at a positive potential relative to the grounded electron emitter 31. The normal path of beam 36 is shown by the horizontal dash line. Normally, the electron beam 36 passes midway between electrodes 32 and 33, and grazes the top edge of output electrode 37. The latter has applied to it the +B voltage from the direct current power supply source (not shown). The anode or output electrode 38 is connected to the +B terminal through the output resistor 39 shunted to ground by I. F. bypass condenser 40. The condenser 41 feeds the audio frequency signals to the utilization network.

Fig. 8 shows as an illustration the beam tube "input voltage vs. output current" detection characteristic of Fig. 7. It will be seen that the upper and lower sections G and G′ of the characteristic are flat. The detector tube, therefore, saturates at the positive and negative half cycles of the input voltage at the input network. The resultant wave (curve F of Fig. 2b) between electrodes 32 and 33 will not disturb the normal path of beam 36 when the waves D and E are in in-phase relation (Fig. 2a). However, this produces a certain output current at anode 38, shown by point M at curve G, G′ in Fig. 8. In other words, the distribution of electrons between output electrode 38 and shield or screen electrode 37 for wave F is to produce output current M. If, now, the wave F′ (Fig. 3b) exists at the input circuit, then electrode 32 has a tendency to pull beam 36 higher up along anode 38 permitting more electrons to reach the anode. Of course, if the beam 36 is pulled high enough the output current begins to flatten out (section G) due to electrons passing over the top edge of anode 38.

Should the resultant wave applied between deflection electrodes 32 and 33 assume the wave form F″ (Fig. 4b), then the electron beam 36 would be pulled from its normal path toward electrode 33. This means that the anode current would begin to decrease by virtue of the screening effect of shield electrode 37. Here, again, the anode current would decrease until the saturation condition G′ were reached. It will, therefore, be seen that in the modification of Fig. 7 there exists inherent amplitude limiting action by virtue of the fact that the phase shifter network is not responsive to changes in amplitude of the signal waves. There, also, exists limiting action at the beam tube so far as maximum frequency deviations of the signal wave is concerned. In other words, the beam degree inherently limits the audio frequency output to the maximum frequency swing of the signals. It should be understood that the beam tube may operate with the input double transformer circuit shown in Figs. 1 and 6, if preferred.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In a method of detecting angle modulated high frequency waves, deriving from the waves a fundamental and an harmonic angle modulated wave, combining said fundamental and harmonic waves to produce a resultant high frequency wave which has a wave form having a variable degree of asymmetry dependent on the angle modulation, and subjecting the resultant wave to symmetrical, non-linear detection to provide a voltage representative of the said variable asymmetry.

2. In a receiver of angle modulated carrier waves, a harmonic generator provided with an input circuit tuned to the carrier frequency, means for applying angle modulated carrier waves to said input circuit, an output network connected to said harmonic generator, said output network including a resonant circuit tuned to said carrier frequency and a second resonant circuit tuned to the second harmonic of said carrier frequency, said output network being constructed for providing phase shifts between the fundamental and second harmonic waves developed respectively in said first and second resonant circuits, said phase shifts depending on the angle modulation, and a detector having a symmetrical, non-linear detection characteristic for rectifying the resultant of the fundamental and second harmonic waves.

3. In combination, in a frequency modulation receiver, a source of frequency modulation signals, a harmonic generator connected to said source and responsive to the signals thereof to provide the fundamental and second harmonic components of the frequency modulation signals, a phase shifter network connected to the generator for varying the relative phases between the fundamental and second harmonic components in accordance with the frequency deviations of the signals, and a symmetrical non-linear detector responsive to the output of the phase shifter for producing a rectified voltage corresponding to the aforesaid phase shifts.

4. In combination with a source of frequency modulated carrier waves, a harmonic generator responsive to said waves to produce a harmonic of the carrier waves, a phase shifter network responsive to said generator for providing phase shifts between the fundamental and harmonic of the carrier waves which depend on the frequency deviation of the carrier waves, and a symmetrical non-linear detector responsive to said phase shifter for detecting the resultant of the fundamental and harmonic of said waves.

5. In a system for detecting angle modulated carrier waves, means for deriving from the angle modulated waves a modulated carrier wave whose wave form has a variable degree of asymmetry dependent on the angle modulation but independent of the amplitude of the angle modulated wave, rectifier means coupled to the deriving means and having a symmetrical detection characteristic, and said rectifier means rectifying the derived wave to provide a signal voltage representative of the angle modulation.

6. In combination with a source of frequency modulated carrier waves, a tube for generating an harmonic of the waves including input and output electrodes, said input electrodes being coupled to the source, a first phase shifter circuit coupled to said output electrodes and normally tuned to the fundamental of the waves, a second phase shifter network in circuit with the first phase shifter and being normally tuned to the second harmonic frequency of the waves, a pair of opposed diodes including respective delay bias means, connections applying the resultant wave output of the two phase shifter networks to said opposed diodes, and means for deriving from the opposed diodes a rectified voltage representative of the frequency deviations of the signal waves.

7. A frequency modulation detector system comprising an harmonic generator, a symmetrical non-linear demodulator circuit, and means coupled between the output of said generator and the input of said demodulator circuit for impressing the fundamental and second harmonic of frequency modulated carrier waves to be detected on said circuit from which modulation frequencies are derived, said means causing the envelope of the combined fundamental and harmonic frequencies to be symmetrical for positive and negative cycles at the center frequency and to cause the envelope to become non-symmetrical for frequencies deviating from center.

8. In a frequency modulation detector system, an harmonic generator adapted to have frequency modulation signals applied to the input thereof, a symmetrical non-linear detector circuit from which modulation frequencies are derived, and means coupled between the output of said generator and the input of said detector circuit for applying to said detector circuit fundamental and second harmonic waves derived from said signals, said applying means being constructed and arranged to cause the envelope of the resultant of said fundamental and harmonic waves to be symmetrical for positive and negative cycles at the center frequency of the signals and to cause the envelope to become non-symmetrical for frequencies deviating from the center frequency.

9. In a system for detecting frequency modulated high frequency waves, means for deriving from the waves a fundamental and an harmonic frequency modulated wave having a resultant high frequency wave which has a wave form having a variable degree of asymmetry dependent on the frequency modulation, and symmetrical non-linear detection means coupled to said deriving means to provide from the resultant wave a voltage representative of the said variable asymmetry.

10. In a receiver of frequency modulated carrier waves, a limiter and harmonic generator provided with an input circuit tuned to the carrier frequency, means for applying frequency modulated carrier waves to said input circuit, an output network connected to said harmonic generator, said output network including a resonant circuit tuned to said carrier frequency and a second resonant circuit in series therewith tuned to the second harmonic of said carrier frequency said output network being constructed for providing phase shifts between the fundamental and second harmonic waves developed respectively in said first and second resonant circuits, and a pair of opposed rectifiers having a symmetrical non-linear detection characteristic for rectifying the resultant of the fundamental and second harmonic waves.

11. In combination, in a frequency modulation receiver, means to provide the fundamental and second harmonic components of the frequency modulation signals, a phase shifter network coupled to and responsive to said means for varying the relative phases between the fundamental and second harmonic components in accordance with the frequency deviations of the signals, and a pair of like-biased opposed diodes coupled to said shifter network providing a symmetrical non-linear detection characteristic for producing a rectified voltage corresponding to the aforesaid phase shifts.

12. In combination with a source of frequency modulated carrier waves, a harmonic generator constructed to produce in response to the source waves a second harmonic of the carrier waves, a phase shifter network coupled to the generator output and constructed to provide phase shifts between the fundamental wave and harmonic wave which depend on the frequency deviation of the carrier waves, and an electron beam tube coupled to the output of said shifter network for detecting the resultant wave of the fundamental and harmonic waves.

13. In a system for detecting angle modulated carrier waves, means for deriving from the angle modulated waves a fundamental and an harmonic angle modulated wave having a resultant modulated carrier wave whose wave form has a variable degree of asymmetry dependent on the angle modulation but independent of the amplitude of the angle modulated wave, a pair of opposed rectifiers coupled to the deriving means and having a symmetrical non-linear detection characteristic for rectifying the derived resultant wave to provide a signal voltage representative of the angle modulations, means for biasing said rectifiers, and means responsive to the intensity of said waves for varying in like manner said biasing means.

14. In combination with a source of frequency modulated carrier waves, a tube for generating an harmonic of the waves including input and output electrodes, said input electrodes being coupled to the source, a first phase shifter circuit coupled to said output electrodes and normally tuned to the fundamental frequency of the waves, a second phase shifter network in circuit with the first phase shifter and normally tuned to the second harmonic frequency of the waves, a pair of opposed diodes including bias means responsive to wave intensity, connections applying the resultant wave output of the two phase shifter networks to said opposed diodes, and means for deriving from the opposed diodes a rectified voltage representative of the frequency deviations of the signal waves.

WENDELL L. CARLSON.

REFERENCES CITED

The following references are of record in the file of this patent:

UNITED STATES PATENTS

| Number | Name | Date |
|---|---|---|
| 2,302,834 | Bliss | Nov. 24, 1942 |
| 2,356,201 | Beers | Aug. 22, 1944 |
| 2,383,855 | Hansell | Aug. 28, 1945 |